US011052909B1

(12) United States Patent
Kulkarni et al.

(10) Patent No.: US 11,052,909 B1
(45) Date of Patent: Jul. 6, 2021

(54) OBJECT ZONE IDENTIFICATION

(71) Applicant: ARIN Technologies, Inc., Pittsburgh, PA (US)

(72) Inventors: Pradyumna P. Kulkarni, McMurray, PA (US); Harish Balakrishnan, Pittsburgh, PA (US); Jay Oppenheim, McMurray, PA (US)

(73) Assignee: ARIN Technologies, Inc., Pittsburgh, PA (US)

( * ) Notice: Subject to any disclaimer, the term of this patent is extended or adjusted under 35 U.S.C. 154(b) by 339 days.

(21) Appl. No.: 16/127,940

(22) Filed: Sep. 11, 2018

(51) Int. Cl.
| | |
|---|---|
| *G06F 7/70* | (2006.01) |
| *B60W 30/09* | (2012.01) |
| *B60Q 9/00* | (2006.01) |
| *G01S 13/08* | (2006.01) |
| *G01S 15/08* | (2006.01) |
| *G01S 17/08* | (2006.01) |

(52) U.S. Cl.
CPC ............ *B60W 30/09* (2013.01); *B60Q 9/008* (2013.01); *B60W 2554/00* (2020.02); *B60W 2720/10* (2013.01); *G01S 13/08* (2013.01); *G01S 15/08* (2013.01); *G01S 17/08* (2013.01)

(58) Field of Classification Search
CPC ............ B60W 30/09; B60W 2554/00; B60W 2720/10; B60Q 9/008; G01S 17/08; G01S 15/08; G01S 13/08; G06F 7/70
USPC ............... 701/23, 41, 70; 340/435, 500, 903
See application file for complete search history.

(56) References Cited

U.S. PATENT DOCUMENTS

| | | | | |
|---|---|---|---|---|
| 2001/0045328 A1* | 11/2001 | Pustelniak | .............. | G01S 17/04 187/317 |
| 2006/0176160 A1* | 8/2006 | Zoratti | ..................... | G08G 1/16 340/435 |
| 2007/0230943 A1* | 10/2007 | Chang | .................... | G03B 37/00 396/322 |
| 2008/0027599 A1* | 1/2008 | Logan | .................. | G05D 1/0261 701/23 |
| 2014/0303845 A1* | 10/2014 | Hartmann | ............. | B60W 10/20 701/41 |
| 2015/0145694 A1* | 5/2015 | Dupont | .................. | B60Q 9/008 340/903 |

(Continued)

FOREIGN PATENT DOCUMENTS

| | | |
|---|---|---|
| EP | 2326999 A1 | 12/2013 |
| WO | 2010034934 A1 | 1/2010 |

OTHER PUBLICATIONS

International Search Report for PCT Application No. PCT/US2019/050430, dated Dec. 5, 2019, 2 pages.

*Primary Examiner* — Shardul D Patel
(74) *Attorney, Agent, or Firm* — Ference & Associates LLC

(57) ABSTRACT

One embodiment provides a method, including: receiving data indicating an object sensor associated with an object is within communication range of a vehicle sensor associated with a vehicle; determining, using a distance calculation algorithm, a distance between the object sensor and the vehicle sensor; identifying a zone, from a plurality of zones that are based upon distances from the vehicle sensor, associated with the determined distance between the object sensor and the vehicle sensor; and providing, based upon the identified zone, an output comprising an indication of the identified zone corresponding to a location of the object sensor. Other aspects are described and claimed.

20 Claims, 4 Drawing Sheets

(56) References Cited

U.S. PATENT DOCUMENTS

| | | | |
|---|---|---|---|
| 2017/0036592 A1* | 2/2017 | Hoffmann | B60Q 1/143 |
| 2017/0269613 A1* | 9/2017 | Bardinet | G01C 21/18 |
| 2019/0179016 A1* | 6/2019 | Raring | G01S 17/931 |
| 2019/0271985 A1* | 9/2019 | Mimura | B60W 60/0011 |
| 2019/0306149 A1* | 10/2019 | Vazquez Vidal | H04L 63/0823 |

* cited by examiner

OBJECT ZONE IDENTIFICATION

BACKGROUND

Many entities use different vehicles (e.g., forklifts, overhead cranes, floor cranes, people movers, cherry pickers, etc.) within an environment to perform different tasks. For example, some entities have forklifts that are used to move objects from one location in the environment (e.g., a storage location) to another location within the environment (e.g., a transportation location). As another example, some entities may use utility task vehicles to transport people from one location in the environment (e.g., an entrance area) to another location within the environment (e.g., another building within the facility). Many of these vehicles have drivers who drive the vehicles throughout the environment. Some vehicles may be automated and may not have drivers, instead being programmed to follow paths to perform particular tasks.

BRIEF SUMMARY

In summary, one aspect provides a method comprising: receiving data indicating an object sensor associated with an object is within communication range of a vehicle sensor associated with a vehicle; determining, using a distance calculation algorithm, a distance between the object sensor and the vehicle sensor; identifying a zone, from a plurality of zones that are based upon distances from the vehicle sensor, associated with the determined distance between the object sensor and the vehicle sensor; and providing, based upon the identified zone, an output comprising an indication of the identified zone corresponding to a location of the object sensor.

Another aspect provides a system, comprising: at least one object sensor, each object sensor being associated with an object; at least one vehicle sensor, each vehicle sensor being associated with a vehicle; a processor operatively coupled to the at least one object sensor and the at least one vehicle sensor; a memory device that stores instructions executable by the processor to: receive data indicating the at least one object sensor is within communication range of the at least one vehicle sensor; determine, using a distance calculation algorithm, a distance between the at least one object sensor and the at least one vehicle sensor; identify a zone, from a plurality of zones that are based upon distances from the at least one vehicle sensor, associated with the determined distance between the at least one object sensor and the at least one vehicle sensor; and provide, based upon the identified zone, an output comprising an indication of the identified zone corresponding to a location of the at least one object sensor.

A further aspect provides a product, comprising: a storage device that stores code, the code being executable by a processor and comprising: code that receives data indicating an object sensor associated with an object is within communication range of a vehicle sensor associated with a vehicle; code that determines, using a distance calculation algorithm, a distance between the object sensor and the vehicle sensor; code that identifies a zone, from a plurality of zones that are based upon distances from the vehicle sensor, associated with the determined distance between the object sensor and the vehicle sensor; and code that provides, based upon the identified zone, an output comprising an indication of the identified zone corresponding to a location of the object sensor.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
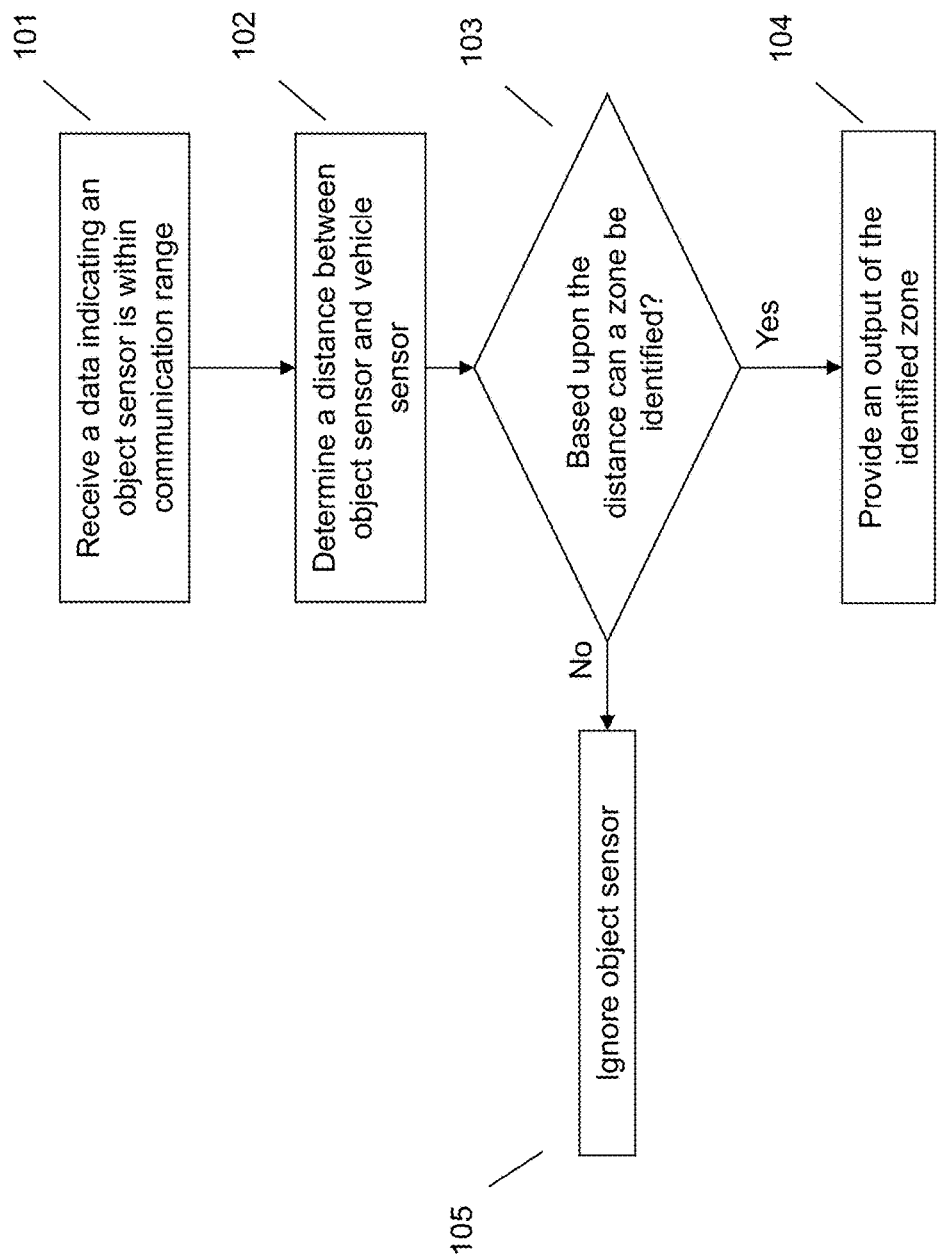
FIG. 1 illustrates a method for providing an output regarding a zone of an object with respect to the vehicle based upon a distance of the object to the vehicle.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Since the environments do not only contain a single vehicle and no other vehicles or objects, the vehicles can interact with other objects within the environment, for example, by running into other objects, having objects cross the path of the vehicle, and the like. In one case the vehicle operator may not be accurately driving the vehicle and run the vehicle into objects. Alternatively, objects may cross the path of the vehicle, for example, another vehicle or pedestrian may walk in front of the vehicle. These problems cause the vehicles to have collisions with objects, which may damage the vehicle, damage other objects, create large messes, injure people, or the like. One reason that the vehicle may be involved in a collision is because the driver is unaware that the object is close to the vehicle, for example, if a person is walking around a corner into the path of the vehicle, the operator may be unable to see the person until after the person turns the corner. Another reason that collisions may occur is because the vehicle has to be operated in close proximity to objects and the driver may misjudge the distance and accidentally collide with the object.

Currently there is no effective solution for monitoring for these collisions. The traditional techniques rely on operator vigilance and safety zones which indicate where pedestrians should remain. However, not all pedestrians are either familiar with the safety zones or choose to ignore the safety zones, which may result in pedestrians where the vehicle operator is not expecting a pedestrian. One traditional technique for attempting to monitor for collisions is the use of magnetic fields being generated around an object or vehicle. The system then attempts to identify when a disturbance in the magnetic field has been detected. However, this technique results in inaccurate and inconsistent results and may not detect all interfering objects. Additionally, not all locations are suitable for generation of magnetic fields, for example, other equipment within the environment may cause interference with these magnetic fields. Another technique is the creation of software geofences by instrumenting the entire environment. However, the problem with this technique is that the latency of response by the system is high, thereby resulting in delayed responses by the system which may result in collisions. Additionally, none of the traditional techniques allow the creation of different distance zones around the vehicle where different output actions occur based upon the zone that the object is detected within.

Accordingly, an embodiment provides a method for providing an output regarding a zone of an object with respect to the vehicle based upon a distance of the object to the vehicle. The system may receive data indicating that an object sensor is within communication range of a vehicle sensor, which allows for detection of objects even when the object sensor is not directly in the line-of-sight of the vehicle sensor. From the sensor information the system can determine the distance of the object sensor from the vehicle sensor. The system can then correlate this distance to a zone of the vehicle sensor, where the zone is selected from a plurality of zones identified around the vehicle. The distance of these zones may be configured by a user or operator of the system. Based upon which zone is identified, the system can provide different output. For example, if the object is within a danger zone of the vehicle, the system may provide an alert to the vehicle operator, automatically slow the vehicle, or the like.

Such a system provides a technical improvement to current collision monitor and/or avoidance systems by providing a system that can use object and vehicle sensors to identify when objects are within a communication range of the vehicle. Using the sensor information the system can determine how far the object is from the vehicle and identify a zone around the vehicle that the object is within. Based upon the identified zone, the system can provide output to different systems so that the vehicle operator may be alerted to the object, a third-party may be notified of a potential collision, the vehicle speed may be automatically reduced, or the like. Thus, the described systems and methods provide a system that more consistently and accurately identifies potential collisions than traditional systems. Additionally, the described systems and methods allow for designation of different distance zones around the vehicle so that different actions can be taken based upon the different zone that the object is detected within.

The illustrated example embodiments will be best understood by reference to the figures. The following description is intended only by way of example, and simply illustrates certain example embodiments.

FIG. 1 illustrates a method for providing an output regarding a zone of an object with respect to the vehicle based upon a distance of the object to the vehicle. At 101 the system may receive data indicating an object sensor associated with an object is within communication range of a vehicle sensor associated with a vehicle. Communication range may be any range where the object and vehicle sensor can receive or send transmissions to the other sensor. Both the object sensor and the vehicle sensor may include the same circuitry, for example, a battery, a transceiver allowing both transmission and receipt of communications, an integrated circuit which may include a processor, or the like. Alternatively, the vehicle sensor and object sensor may include different circuitry, for example, the vehicle sensor may include a speaker where the object sensor does not, the object sensor may include a haptic feedback mechanism wherein the vehicle sensor does not, a vehicle sensor may include a transceiver and the object sensor may only include a transmitter, or the like. Alternatively, both sensor types may include all the same circuitry where only specific components are activated based upon the sensor type.

The objects may include many different objects that can be found in different environments (e.g., manufacturing facilities, storage facilities, compounds, etc.). Example objects include pedestrians, buildings, other vehicles, pallets, products, walls, floors, power lines, and other stationary or movable objects. It should be understood that other vehicles can be considered objects even though those vehicles would include a vehicle sensor. In other words, the term "object sensor" is used to designate another sensor from the perspective of the target vehicle. Each of the objects may include one or more object sensors that are located on or attached to the object, using any of a variety of attachment mechanisms. For example, a pedestrian may wear the object sensor in a badge, key card, or the like, as a lanyard, bracelet, within a safety hat, or other wearable object. As another example, the object sensor may be attached to or placed upon different stationary objects or objects that cannot move without another force acting upon the object.

The vehicles may include any object within the environment that can move under its own power, for example, forklifts, side-by-side vehicles, robots, utility task vehicles, cherry pickers, overhead cranes, floor cranes, and the like. The vehicles may either be moved via operation by a vehicle operator or may be moved in response to being programmed through software, for example, in the case of a robot that does not require a human operator. The vehicle sensors may be mounted or otherwise attached to the vehicle. Using the example of a forklift, the vehicle sensor may be attached to the roll cage of the forklift, the roof of the roll cage, a dashboard of the vehicle, or the like. The attachment of the vehicle sensor may be accomplished using one of many different attachment techniques, for example, clasps, bolts, fasteners, or the like. Alternatively, the vehicle sensors may not be attached to the vehicle at all. Rather, the vehicle sensors may be attached at fixed known sensor locations. In this case, the system may apply a virtual zone in space based upon the fixed known vehicle sensor locations. The system can then apply a line, parabola, or any other shape, around the fixed known vehicle sensor locations to create the virtual space.

Figure 2:
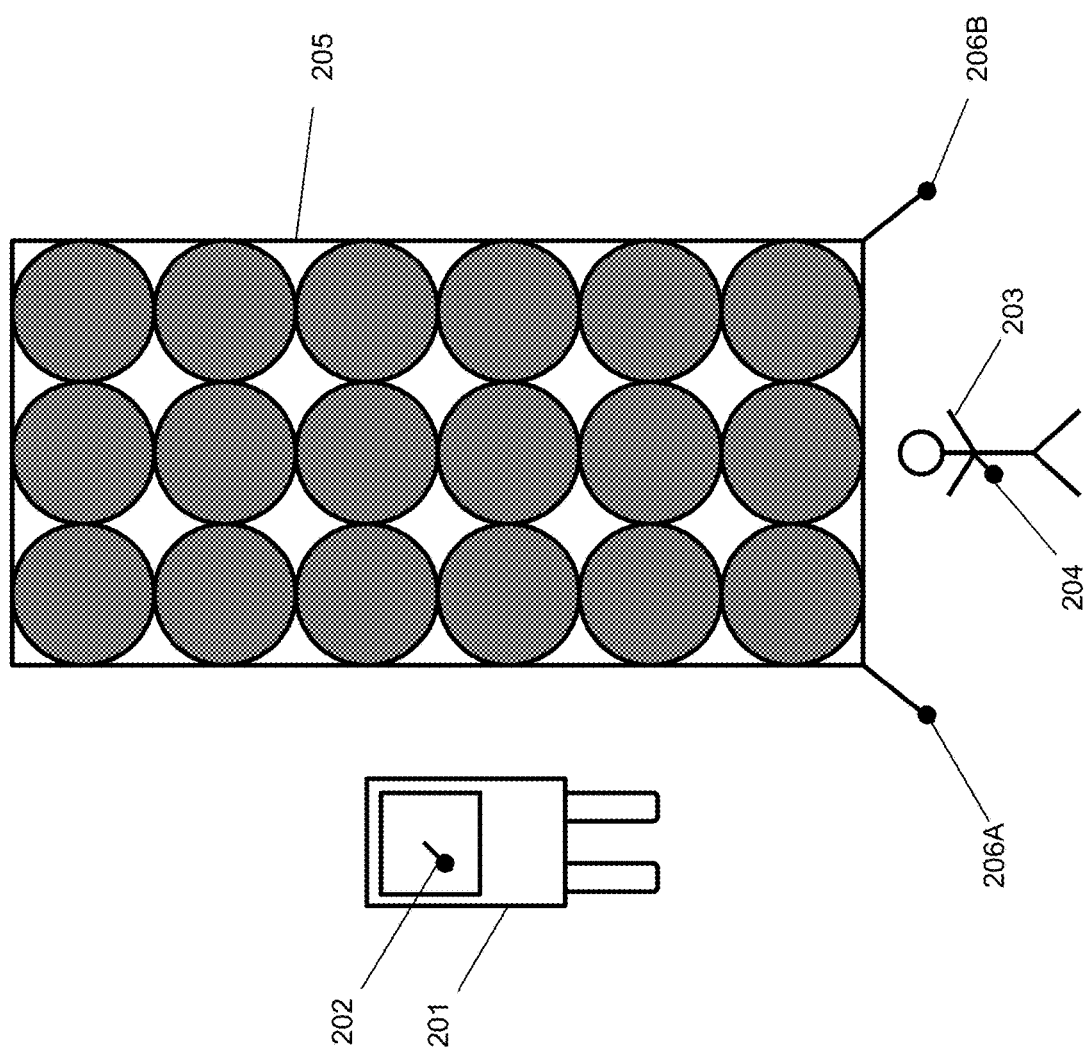
FIG. 2 illustrates example zone designations with respect to a vehicle.

Another type of object sensor may include a corner sensor. This type of sensor may be attached to or positioned at a corner of an object, for example, a shelving unit, a large object that blocks the view around a corner, or any other object. Such a corner sensor may allow for identification of objects within a zone of the vehicle sensor even when the object sensor is not directly in the line-of-sight of the vehicle sensor. FIG. 2 illustrates an example. The forklift 201 includes a vehicle sensor 202. A pedestrian 203 is wearing an object sensor 204. A object 205 is placed within the environment which prevents the forklift 201 operator from seeing the pedestrian 203 located around the corner of the object 205 from the forklift 201. Accordingly, the object 205 includes two corner sensors 206A and 206B. These corner sensors 206A and 206B can detect the object sensor 204. The corner sensor, likely 206A in this example, can then relay the information received from the object sensor 204 and/or the vehicle sensor 202 to the vehicle sensor 202 and/or object sensor 204, respectively. This information may include any information that is needed by the system to perform any of the subsequent steps as described in more detail herein. In other words, the corner sensor 206A and 206B act as a repeater for the object sensor 204 and/or the vehicle sensor 202.

The system may include a database or other data storage location that is accessible through a user interface. The user interface allows a user to configure the system, update software, manage devices in or connected to the system, or the like. Each of the sensors may be associated with a particular object or vehicle. Each sensor has a unique sensor identifier that can be associated with an object or vehicle in the database or other data storage location, which may accessible through the user interface. For example, a system programmer or manager may assign each of the sensors to a particular object (e.g., object sensor having identifier 1 belongs to worker Steve, vehicle sensor having identifier 2 belongs to forklift 1, etc.). This allows the system to identify the specific object or vehicle within the environment. This identification may be useful in order to perform different actions based upon the object or vehicle that is encountered, as explained in more detail below. As stated before, the sensors may all include the same circuitry, so the data storage location may be used to identify how the sensor should act, for example, as an object sensor, vehicle sensor, zone identifier sensor, or the like.

The data storage programming may also be used to assign a sensor as a particular zone within the environment. The environment may include different zones, for example, loading zones, parking zones, normal zones, safety zones, or the like. The sensor may then be assigned to that zone so that when a vehicle is within communication range or a predetermined distance from the sensor, the vehicle can identify that area as a particular zone within the environment. In other words, each environmental zone includes sensors that are used to transmit an indication that identifies the zone to the vehicle. If the vehicle is within communication range or within a predetermined distance of these environmental zone sensors, the vehicle sensor is provided with this information. If the vehicle sensor is within range or distance of the environmental zone sensors, this information may be used to identify the location of the vehicle within the environment. For example, if the vehicle sensor is within range of the loading zone, the location of the vehicle may be identified as within the loading zone location within the environment. In other words, the vehicle knows its location within the environment based upon the environment zone sensor/units. The system may also include areas that do not include environment zone sensor/units. In these areas, the vehicle may operate as if it is in a default or normal mode or zone. For example, a warehouse may only include environment sensors in the zones where the facility wants the vehicle to operate differently than how the vehicle would operate in a normal zone. Thus, where the vehicle cannot detect an environmental sensor or if the vehicle is outside the designated zones, the vehicle will operate in a default or normal mode.

The communication range of the environmental zone sensors, or any of the other sensors, may be greater than the distance that a system operator actually wants the system to react to. Thus, the sensors can be programmed to only respond to a sensor transmission if the sensor is within a predetermined distance of the responding sensor. For example, the environmental zone sensors may have a communication range of 30 m. However, the environmental zone may only actually need to be 10 m in depth. Thus, the vehicle sensor, or other sensors, may only react to the environmental zone sensor if the distance from the environmental zone sensor is 10 m or less. The predetermined distance, the environmental zone identifiers, the location of the environmental zones, and the like, can be selected or identified by a facility manager, system programmer, system manager, or the like. Depending on the zone that the vehicle is within in the environment, the system may perform different actions or provide different outputs based upon the zone, as explained in more detail below.

At 102 the system may determine a distance between the object sensor and the vehicle using a distance calculation algorithm. For example, the sensors may track timestamps of the communication messages between the different sensors. These timestamps allow the system or the sensors to identify the distance between the sensors. For example, the sensors may calculate the distances using time of flight calculations. The time of flight calculations may be more or less accurate depending on the type of communications used. For example, the less bandwidth or slower the communication channel between the sensors, the less accurate the distance calculation will be. Accordingly, an embodiment may use ultrawide band (UWB) communication channels to provide an accuracy within a small distance, for example, within 10 cm.

Identifying the distance may also include identifying a direction of the object with respect to the vehicle. For example, having multiple sensors would allow the system to determine which sensor first received the information thereby indicating a general direction of the object with respect to the vehicle. Identifying the distance may also include identifying a movement of the object with respect to the vehicle. For example, based upon multiple distance calculations, the system can determine if the object is moving away from the vehicle. These multiple distance calculations may also allow an identification of how quickly the object is moving towards or away from the vehicle. The direction of the object with respect to the vehicle, movement of the object, a direction of movement of the object, and the like, may result in different outputs being provided, as discussed in more detail below.

Figure 3:
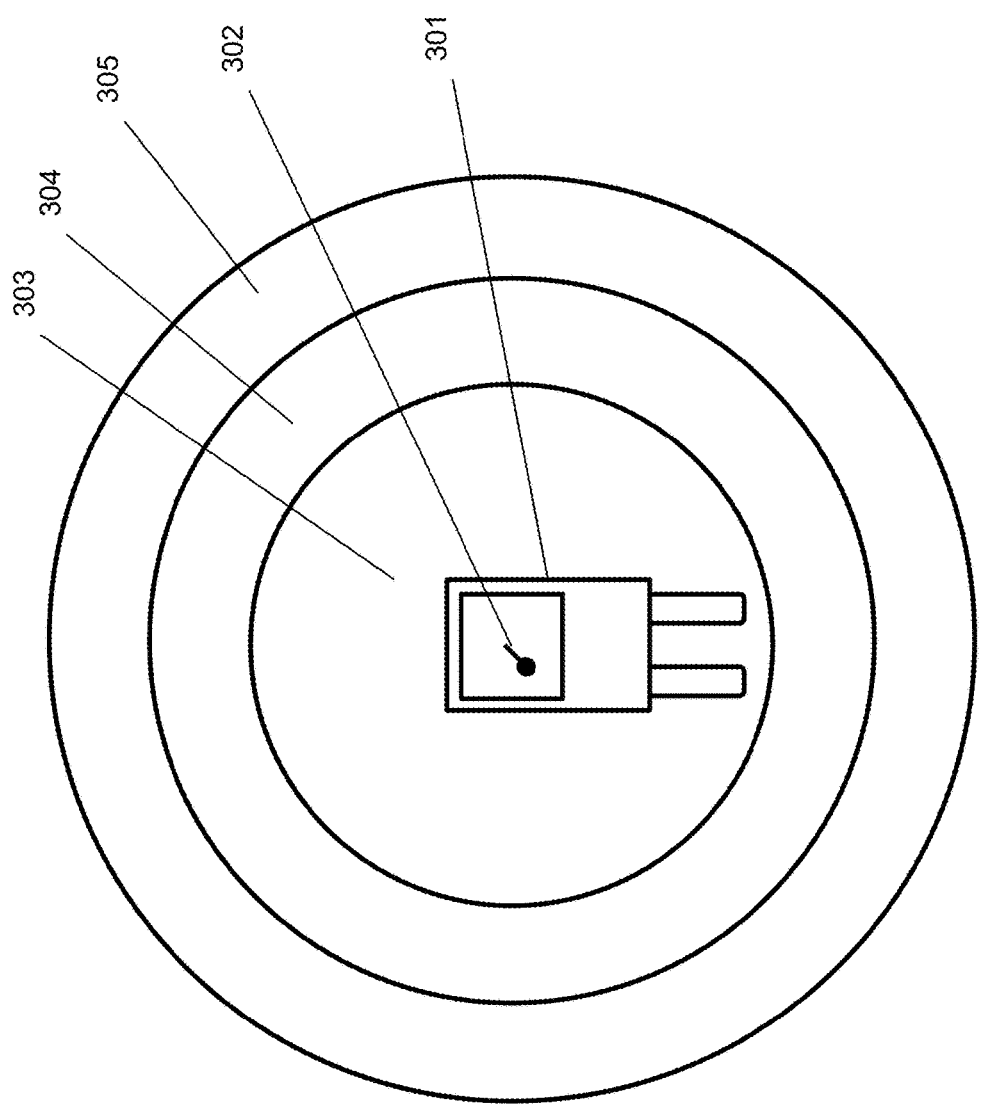
FIG. 3 illustrates an example corner sensor unit with respect to an object and a vehicle.

At 103 the system may determine whether a vehicle zone can be identified. A vehicle zone is a zone with respect to the vehicle sensor. Each of the zones is associated with a particular distance from the vehicle sensor. The number of zones, zone identifiers, distance of the zones from the vehicle sensor, shape of the zones, and the like, can be user configurable, for example, using the user interface as described above. For example, FIG. 3 illustrates an example vehicle 301, a forklift, and a vehicle sensor 302 attached to the forklift. The first zone 303 is located directly around the vehicle sensor 302, with the vehicle sensor 302 at the center of the zone. As an example, this zone 303 may be programmed as a driver safe zone and may extend 1 m around the vehicle sensor 302. The second zone 304 is located outside the first zone 303, with the vehicle sensor 302 at the center of this zone. As an example, this second zone 304 may be programmed as a danger zone and may extend from 1 m around the vehicle sensor 302, where the first zone 303 ends, to up 3 m around the vehicle sensor 302. Third zone 305 is located outside the second zone 304, with the vehicle sensor 302 at the center of this zone. As an example, this third zone 305 may be programmed as a warning zone and may extend from 3 m around the vehicle sensor 302, where the second zone 304 ends, to up to 5 m around the vehicle sensor 302. If an object is detected in any of these zones, the system may provide an output, as described in more detail below.

Even though FIG. 3 illustrates the zones as circles or as occurring at different radii around the vehicle, the shape of the zones may be any shape based upon how the system is implemented. For example, in one embodiment, the system may include multiple devices within the environment, attached the vehicle, attached to objects, or a combination thereof. In such a case, the system can identify the position of objects within the environment based upon a coordinate system. Thus, the system can use a mathematical technique (e.g., trilateration, etc.) to determine the position of the object within the coordinate system. Therefore, the zones can be defined as any shape, for example, rectangles, ellipses, lines, parabolas, and the like. This concept of defining zones as any shape also applies to the environmental zones explained above.

Not only are the sizes, identifiers, shape, and number of zones configurable by the user, but they are also configurable based upon the environmental zone that the vehicle is currently located within. As explained above, the environment may include different zones, for example, a parking zone, normal zone, loading zone, safety zone, pedestrian zone, and the like, with each zone requiring a different reaction by the vehicle sensor. Thus, if the vehicle is located within one of these environmental zones, the zones around the vehicle may be modified causing the system to behave differently. For example, if the vehicle is located in a loading zone, the innermost vehicle zone may cause no output from the system. If, however, the vehicle is located in a normal zone, the innermost vehicle zone may cause an audible output having a very high frequency of output. Additionally, the size and/or shape of the vehicle zones may change based upon the environmental zone that the vehicle is located within. For example, in a parking zone the innermost zone may be within a distance of a few feet of the vehicle, whereas in a safety zone the innermost zone is within a distance of a few meters of the vehicle.

If the system cannot identify a zone based upon the distance of the object sensor to the vehicle sensor, the system may ignore the object sensor at 105. The system may also ignore the object sensor if the object sensor is outside the outermost zone of the vehicle sensor. In other words, while the vehicle sensor may detect and be able to communicate with the object sensor, the distance of the object from the vehicle may not correspond to any zone that requires any action by the system. Thus, the vehicle sensor may ignore the object sensor.

If, however, the system can identify a zone based upon the distance of the object to the vehicle sensor, the system may provide an output that indicates the identified zone corresponding to the location of the object sensor with respect to the vehicle at 104. In other words, if the system determines that the object is within one of the designated vehicle zones, the system may provide an output that indicates which zone the object is within. The provided output may be used to notify either the object or the vehicle operator that a collision is possible. Provided outputs may include audible outputs, haptic outputs, visual outputs, or the like. Example audible outputs may include beeps, alarms, voice alerts, or the like. An example haptic output may include a vibration of a pedestrian badge to notify the pedestrian that a vehicle is within a certain distance of the pedestrian. Example visual outputs may include an alert being displayed on a display device, a graphic pop-up on a display device, the activation of a light, or the like.

The provided output may also include other actions. As an example, if the system detects an object within a certain zone of the vehicle sensor, the system may take action to reduce the speed of the vehicle automatically. As another example, the system may send alert reports to a third device, for example, a hub or gateway device or the user interface. These alert reports may be used to perform analytics to identify statistics regarding near miss incidents, monitor the health of the system, analyze object and vehicle movement, identify utilization of sensors, and the like. The hub or gateway device or the user interface can be accessed by a system manager, facility operator, or any other authorized user. As another example, the system may activate a barrier if an object sensor is detected within a predetermined zone of the vehicle sensor.

As discussed above, the provided output may change based upon the zone that the object is within with respect to the vehicle, the environmental zone that the vehicle is currently located within, the identified object that is associated with the object sensor, the movement of the object with respect to the vehicle, and the like. As an example, if the object is detected within the outermost zone of the vehicle sensor, in a previous example identified as a warning zone, the system may provide an audible alert at a predetermined frequency. When the object moves within the center zone, identified in the previous example as the danger zone, the system may provide an audible alert at predetermined frequency that is greater than the frequency associated with the outer zone. When the object moves within the innermost zone, identified as the driver safe zone the predetermined frequency may increase. On the other hand, the audible output may decrease to a frequency less than the outermost zone or stop altogether. This may be useful in locations where a driver frequently enters or exits the vehicle, where other people frequently stop to talk to the driver or the like. In such a situation, the operators may not want a provided output since, at the distance that the object is away from the vehicle, the operator would be aware of the object.

As another example, if the vehicle is located within a particular environmental zone, the provided output may change as compared to the output provided in a different environmental zone. For example, if the vehicle is located within a parking zone, the system may only provide output when the vehicle is within a very small distance of another object. In other words, in the parking zone there may be many vehicles which would cause output to be provided almost constantly if programmed like other zones, thereby becoming useless in informing the operator of a potential collision. Therefore, the system may be programmed to only provide output in this zone if the vehicle is within a few inches of another object within the zone. As another example, if the vehicle is within a loading zone the innermost zone may be programmed as a driver safe zone and may provide no or reduced output when an object is within the driver safe zone. However, when the vehicle is within the normal zone, the innermost zone may be programmed as an imminent collision zone and the provided output may be increased or more urgent.

As another example, the provided output may vary based upon identification of the object. For example, if the object is identified as a pedestrian the provided output may be more urgent, frequent, or of a different modality (e.g., visual versus audible, haptic versus visual, a combination of modalities, etc.) than if the object is identified as a stationary object. Additionally, particular objects may have different priorities than other objects. For example, if a collision with a particular object would create a larger issue than a collision with a different object, the provided output may vary based upon this factor. As another example, if the pedestrian associated with the object sensor is a very important person or identified as a person who is not familiar with the environment, the provided output may vary. For example, if the person is a very important person, the provided output may not just include an audible output, but may also include automatically reducing the speed of the vehicle.

As another example, the provided output may vary based upon the movement or speed of the object with respect to the vehicle. For example, if the object is moving away from the vehicle at a speed which would prevent the vehicle from colliding with the object, the system may provide no output. As another example, if the object is moving very quickly towards the vehicle, the provided output may be increased as compared to the output that would normally correspond to the detected zone. A variety of other factors for varying the provided output are possible and contemplated. Additionally, a system operator, facility manager, system programmer, or the like, can program the system to identify what output should be provided and under what conditions the output should be provided within.

Thus, the described systems and methods provide a more consistent and accurate alert system than traditional techniques. Additionally, since the described systems and methods are able to be programmed for each environment, the described systems and methods are more user-friendly, dynamic, and configurable than traditional methods, thereby providing a system that can be used in more environments and that can be tailored to the desired environment than traditional systems.

Figure 4:
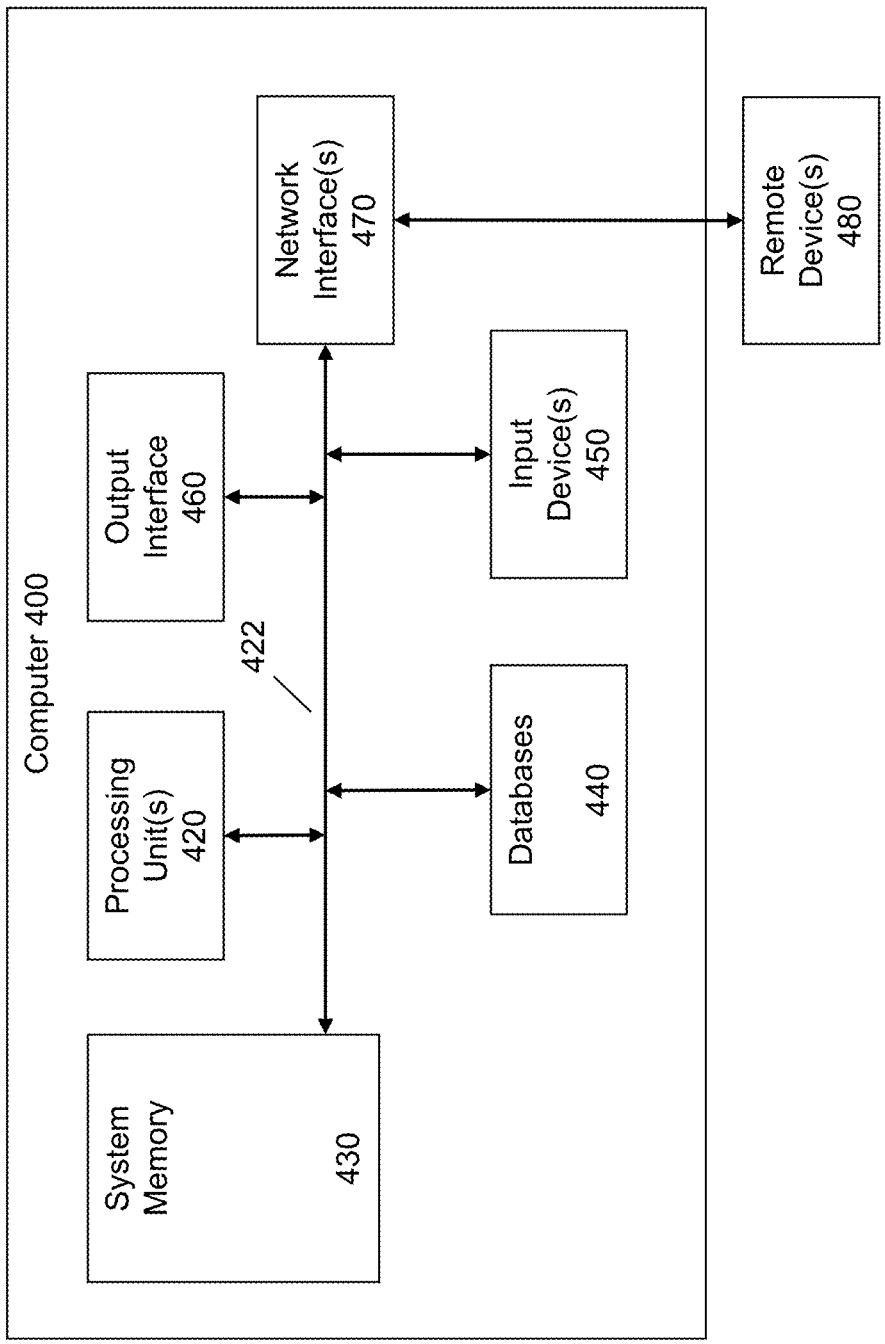
FIG. 4 illustrates an example of device circuitry.

While various other circuits, circuitry or components may be utilized in information handling devices, with a computer, server, client device or the like, an example device that may be used in implementing one or more embodiments includes a computing device in the form of a computer 400 as illustrated in FIG. 4. This example device may be a server used in one of the systems in a network, or one of the remote computers connected to the network. Components of computer 400 may include, but are not limited to, a processing unit 420, a system memory 430, and a system bus 422 that couples various system components including the system memory 430 to the processing unit 420. Computer 400 may include or have access to a variety of computer readable media, including databases. The system memory 430 may include non-signal computer readable storage media, for example in the form of volatile and/or nonvolatile memory such as read only memory (ROM) and/or random access memory (RAM). By way of example, and not limitation, system memory 430 may also include an operating system, application programs, other program modules, and program data.

A user can interface with (for example, enter commands and information) the computer 400 through input devices 480. A monitor or other type of device can also be connected to the system bus 422 via an interface, such as an output interface 460. The computer may include a database 440. In addition to a monitor, computers may also include other peripheral output devices. The computer 400 may operate in a networked or distributed environment using logical connections to one or more other remote device(s) 480 such as other computers. The logical connections may include network interface(s) 470 to a network, such as a local area network (LAN), a wide area network (WAN), and/or a global computer network, but may also include other networks/buses.

Information handling device circuitry, as for example outlined in FIG. 4, may be used in client devices such as a personal desktop computer, a laptop computer, or smaller devices such as a tablet or a smart phone. In the latter cases, i.e., for a tablet computer and a smart phone, the circuitry outlined in FIG. 4 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 4 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
   receiving data, from an object sensor operatively coupled to an object, indicating the object sensor is within communication range of a vehicle sensor associated with a vehicle, wherein the vehicle is located within an environment having defined boundaries within a system;
   determining, using a distance calculation algorithm, a distance between the object sensor and the vehicle sensor;
   identifying a zone, from a plurality of zones defined around the vehicle sensor, wherein each of the plurality of zones are defined based upon distances from the vehicle sensor, associated with the determined distance between the object sensor and the vehicle sensor; and
   providing an output comprising an indication of the identified zone corresponding to a location of the object sensor, wherein each of the plurality of zones is associated with an output indicative of the identified zone and is different between each of the plurality of zones, wherein the output being different between each of the plurality of zones comprises at least one of: a modification of an output provided within a different of the plurality of zones and a different modality of output as compared to an output provided within a different of the plurality of zones.

2. The method of claim 1, further comprising identifying a location of the vehicle within an environment; and
   wherein the distances associated with each of the plurality of zones is based upon the identified location of the vehicle within the environment.

3. The method of claim 2, wherein the identifying a location of a vehicle is based upon an identifier associated with the object sensor.

4. The method of claim 1, further comprising identifying, based upon correlating an identifier of the object sensor with object identifications in a data storage location, a particular object associated with the object sensor; and
   wherein the provided output is based upon the identified object.

5. The method of claim 1, wherein the receiving data comprises receiving data from a corner sensor that receives data from the object sensor; and
   wherein the corner sensor provides information corresponding to a distance of the object sensor from the corner sensor.

6. The method of claim 1, wherein the determining a distance comprises determining a direction and movement of the object sensor with respect to the vehicle sensor.

7. The method of claim 1, wherein the provided output associated with a zone closest to the vehicle sensor comprises no output.

8. The method of claim 1, wherein the distance calculation algorithm comprises a time of flight distance calculation algorithm.

9. The method of claim 1, further comprising performing an action with respect to the vehicle based upon the identified zone.

10. The method of claim 1, wherein the output is selected from the group consisting of: audible output, haptic output, visual output, and controlling a vehicle system.

11. A system, comprising:
    at least one object sensor, each object sensor operatively coupled to an object;
    at least one vehicle sensor, each vehicle sensor being associated with a vehicle;
    a processor operatively coupled to the at least one object sensor and the at least one vehicle sensor;
    a memory device that stores instructions executable by the processor to:
    receive data, from at least one of the at least one object sensors, indicating the at least one of the at least one object sensors is within communication range of the at least one vehicle sensor, wherein the vehicle is located within an environment having defined boundaries within the system;
    determine, using a distance calculation algorithm, a distance between the at least one object sensor and the at least one vehicle sensor;
    identify a zone, from a plurality of zones defined around the vehicle sensor, wherein each of the plurality of zones are defined based upon distances from the at least one vehicle sensor, associated with the determined distance between the at least one object sensor and the at least one vehicle sensor; and
    provide an output comprising an indication of the identified zone corresponding to a location of the at least one object sensor, wherein each of the plurality of zones is associated with an output indicative of the identified zone and is different between each of the plurality of zones, wherein the output being different between each of the plurality of zones comprises at least one of: a modification of an output provided within a different of the plurality of zones and a different modality of output as compared to an output provided within a different of the plurality of zones.

12. The system of claim 11, further comprising instructions to identify a location of the vehicle within an environment; and
wherein the distances associated with each of the plurality of zones is based upon the identified location of the vehicle within the environment.

13. The system of claim 12, wherein to identify a location of a vehicle is based upon an identifier associated with the object sensor.

14. The system of claim 11, further comprising instructions to identify, based upon correlating an identifier of the object sensor with object identifications in a data storage location, a particular object associated with the object sensor; and
wherein the provided output is based upon the identified object.

15. The system of claim 11, wherein to receive data comprises receiving data from a corner sensor that receives data from the object sensor; and
wherein the corner sensor provides information corresponding to a distance of the object sensor from the corner sensor.

16. The system of claim 11, wherein to determine a distance comprises determining a direction and movement of the object sensor with respect to the vehicle sensor.

17. The system of claim 11, wherein the provided output associated with a zone closest to the vehicle sensor comprises no output.

18. The system of claim 11, wherein the distance calculation algorithm comprises a time of flight distance calculation algorithm.

19. The system of claim 11, further comprising instructions to perform an action with respect to the vehicle based upon the identified zone.

20. A product, comprising:
a storage device that stores code, the code being executable by a processor and comprising:
code that receives data, from an object sensor operatively coupled to an object, indicating the object sensor is within communication range of a vehicle sensor associated with a vehicle, wherein the vehicle is located within an environment having defined boundaries within a system;
code that determines, using a distance calculation algorithm, a distance between the object sensor and the vehicle sensor;
code that identifies a zone, from a plurality of zones defined around the vehicle sensor, wherein each of the plurality of zones are defined based upon distances from the vehicle sensor, associated with the determined distance between the object sensor and the vehicle sensor; and
code that provides an output comprising an indication of the identified zone corresponding to a location of the object sensor, wherein each of the plurality of zones is associated with an output indicative of the identified zone and is different between each of the plurality of zones, wherein the output being different between each of the plurality of zones comprises at least one of: a modification of an output provided within a different of the plurality of zones and a different modality of output as compared to an output provided within a different of the plurality of zones.

* * * * *